United States Patent [19]

Tollet

[11] 4,284,003
[45] Aug. 18, 1981

[54] PRINTER WITH A PLURALITY OF ELECTRICALLY CONTROLLED PRINT WHEELS

[75] Inventor: Marcel Tollet, Paris, France

[73] Assignee: Societe pour l'Affranchissemert et le Timbrage Automatiques (S.A.T.A.S.), Clichy, France

[21] Appl. No.: 148,073

[22] Filed: May 12, 1980

Related U.S. Application Data

[63] Continuation of Ser. No. 906,303, May 15, 1978, abandoned.

[30] Foreign Application Priority Data

May 16, 1977 [FR] France .................... 77 14896

[51] Int. Cl.³ .............................................. B41J 1/44
[52] U.S. Cl. ..................................... 101/99; 101/93.22
[58] Field of Search ............... 101/93.22, 95, 96, 99, 101/110

[56] References Cited

U.S. PATENT DOCUMENTS

| | | | |
|---|---|---|---|
| 3,141,403 | 7/1964 | Brown et al. | 101/99 |
| 3,363,547 | 1/1968 | Thut et al. | 101/99 X |
| 3,504,622 | 4/1970 | Morrison | 101/99 |
| 3,756,147 | 9/1973 | Gross et al. | 101/95 |
| 3,858,506 | 1/1975 | Frost | 101/99 X |
| 3,954,055 | 5/1976 | Hanaoka | 101/93.22 X |
| 3,967,550 | 7/1976 | Busul | 101/93.22 |
| 4,104,967 | 8/1978 | Okabe | 101/93.22 X |

OTHER PUBLICATIONS

Hahn, IBM Tech. Discl. Bulletin, vol. 15, No. 5, Oct. 1972, pp. 1410-1411.

Primary Examiner—Edward M. Coven
Attorney, Agent, or Firm—Sughrue, Mion, Zinn, Macpeak and Seas

[57] ABSTRACT

An electric printer which allows sure printing which depends on identity between the orders given on the keyboard and the movement of the printing wheel. It includes means for uncoupling the drive shaft from the wheel and two sensors one of which indicates the position of the drive shaft and the other of which indicates the number of positions passed by the wheel before it stops. Application to a printer used for counting.

1 Claim, 4 Drawing Figures

PRINTER WITH A PLURALITY OF ELECTRICALLY CONTROLLED PRINT WHEELS

This is a continuation of application Ser. No. 906,303 filed May 15, 1978, now abandoned.

FIELD OF THE INVENTION

The present invention relates to a printer including a plurality of electrically controlled wheels, said wheels printing figures or signs on a roll of paper.

BACKGROUND OF THE INVENTION

Prior printers print in response to an operator using a keyboard which sends electric signals to position a wheel from a starting position, the movement being controlled by a shaft driven by a motor and rotating through a complete turn in one direction then in the other.

A disadvantage of former machines resides in the fact that when they stop accidentally, they print the value at which they stopped.

Preferred embodiments of the present invention overcome this drawback.

SUMMARY OF THE INVENTION

The present invention provides a printer having a plurality of electrically controlled wheels, the wheels being driven by a drive shaft rotating alternately in a drive direction and then in a return direction, there being a pause for printing between the movements in opposite directions, each of the print wheels having typographical characters on its periphery, and being associated with a ratchet wheel having teeth at its periphery, said teeth being engaged by a stop lever which is released by an electromagnet in response to an electronic signal representative of the value to be displayed when the angular movement of said drive shaft corresponds to the value to be displayed, means for uncoupling the shaft from the wheel to separate said drive shaft from said wheel subsequent to the engagement of said stop lever in one of said teeth and electronic means for counting the number of positions through which each of said wheels rotates between a starting position and a stopping position to validate the position of the print wheels as set by the stop levers by comparision of each wheel's actual position with its intended position.

BRIEF DESCRIPTION OF THE DRAWINGS

An embodiment of the invention is described by way of example with reference to the accompanying drawings.

DESCRIPTION OF THE PREFERRED EMBODIMENT

Figure 1:
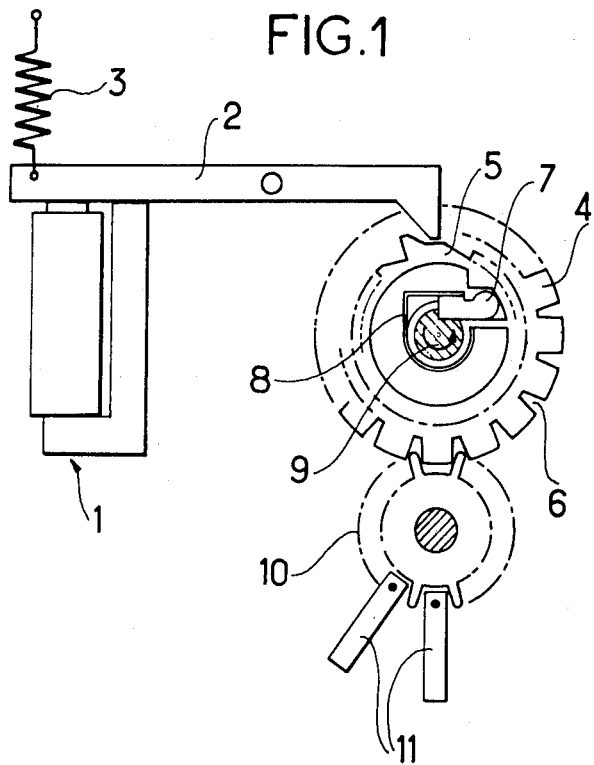
FIG. 1 is a schematic cross-section of a wheel of a printer in the rest position, with its associated components.

The printer is constituted by a plurality of printing columns. Each printing column such as shown in FIG. 1 includes an electromagnet 1 which attracts a stop lever 2 when the electromagnet 1 is energized, the stop lever 2 being returned by a spring 3 and a print wheel 4 which is integral with a ratchet wheel 5 which has teeth, on which the end of the stop lever 2 bears. The print wheel 4 has fifteen type characters for example engraved at its periphery, spaced apart by hollows 6 between teeth which are comparable to these of a toothed wheel. The ratchet wheel 5 has a catch 7 held by a spring 8. A drive shaft 9 which can rotate through 360° in both directions has a V-shaped notch in which the catch 7 engages. The assembly formed by the catch 7 and the spring 8 provides a friction drive of the print wheel 4 by the drive shaft 9. A check wheel 10 which has fifteen teeth, for example, is driven by the print wheel 4. A photoelectronic detector 11 disposed level with the teeth of the control wheel 10 detects as many teeth of the check wheel 10 as the number of characters through which the print wheel 4 passses before being stopped by the stop lever 2. It is sufficient to count this number of teeth to know the real rotation of the print wheel 4.

Figure 2:
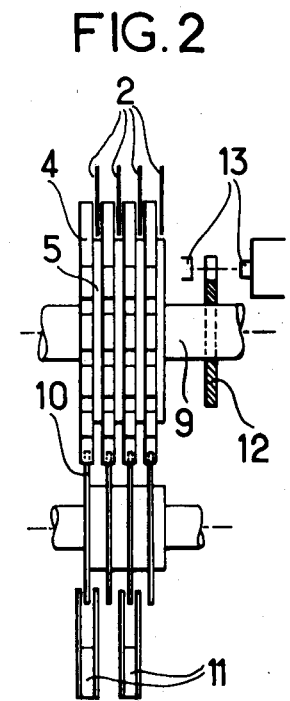
FIG. 2 is a schematic side view of several wheels of a printer.

FIG. 2 shows an assembly of four print wheels 4, it being understood that this assembly could consist of a few tens of printing columns. A disc 12 which has notches on its periphery—the number of notches being the same as the number of type characters of the print wheels 4—is disposed on the drive shaft 9 outside the printing columns. A photo-electronic sensor 13 makes it possible to detect the notches of the disc 12. The sensor 13 delivers pulses representative of the position of the drive shaft 9.

Figure 3:
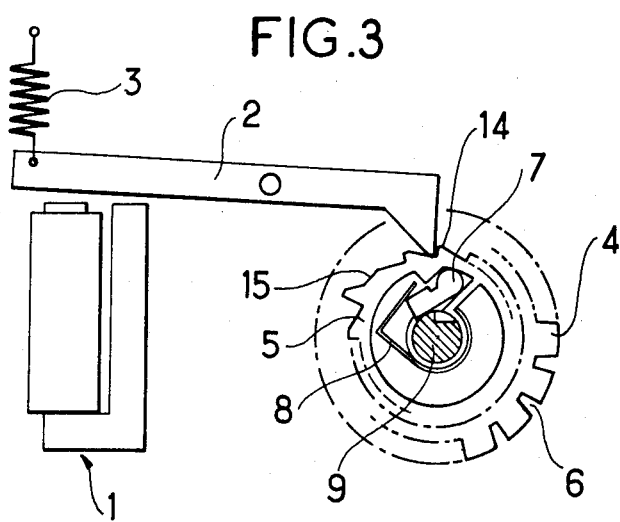
FIG. 3 shows the same components stopped.

FIG. 3 shows a print wheel 4 stopped on its second tooth 14, for example, the wheel having left the original position 15 of FIG. 1. This disposition is attained after one complete revolution of the drive shaft 9 in the direction of the arrow. When the drive shaft 9 rotates, it drives the wheel 4 by means of the catch 7 held by its spring 5 since the catch 7 engages in the V-shaped notch of the drive shaft (FIG. 1). In FIG. 2, the stop lever 2 drops due to the action of its spring 3 subsequent to the cut-out of the electro-magnet 1 and the head of the lever 2 moves to a position in front of a tooth 14 of the ratchet wheel 5. The print wheel 4 stops and as the drive shaft 9 continues to rotate, the catch 7 leaves the V-shaped notch of the drive shaft 9 and the shaft is uncoupled from the wheel.

While the ratchet wheel 5 is stopped in the second tooth 14 position, the drive shaft 9 continues to rotate in the direction of the arrow, then stops. After the printing operation, the drive shaft 5 rotates in the opposite direction to the arrow, the catch 7 engages again in the V-shaped notch of the drive shaft and as the shaft is coupled to the wheel, the print wheel 4 is brought to its original position.

Figure 4:
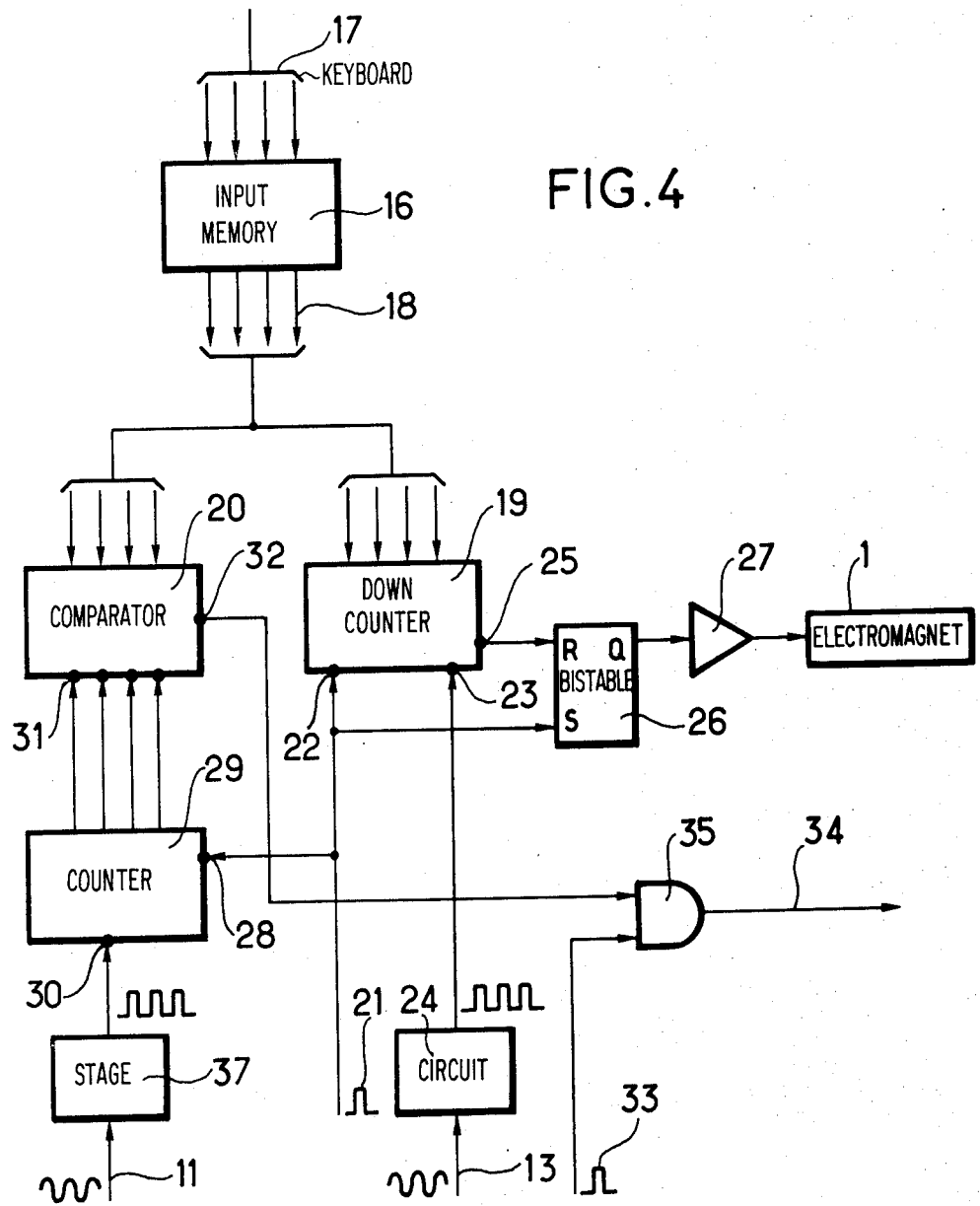
FIG. 4 is a block diagram of the electronic circuitry of the printer.

In addition to being synchronised by the mechanical arrangement, the various operations are synchronised by an electronic arrangement. This arrangement, such as schematically shown in FIG. 4, includes an input memory 16 which contains the binary value which comes for example from a keyboard 17. This binary value corresponds to the required stop position of the print wheel 4 and remains in the memory during a complete cycle constituted by the rotation of the drive shaft 9 in both directions and until a new value is inserted.

The output 18 of the input memory 16 is sent firstly to a down counter 19 and secondly to a comparator 20. The contents of the memory 16 are transferred to the down counter 19 when a cycle start pulse 21 is received which reaches the pre-positioning terminal 22 of the down counter 19. The down counter 19 also receives on its down-counting terminal 23 the signals coming from the sensor 13 which senses the position of the drive shaft 9, which are shaped by a circuit 24 and transformed into rectangular pulses. The result of this is that the sensor 13 sends a pulse which decrements the counter at each position of the drive shaft.

The output 25 of the down counter supplies a logic state 1 when the value transferred by the input memory 16 is reduced to zero by the down counting. In the other cases, the output 25 of the down counter supplies a logic state 0. An RS bistable 26 whose operation is governed by the following truth table:

| S | R | Q |
|---|---|---|
| 0 | 1 | 0 |
| 1 | 0 | 0 |
| 1 | 1 | 1 | receives on its R input the signal coming from the output 25 and on its S input the "cycle start" pulse which sets the bistable 26. The bistable 26 is positioned in the state 1 on its Q output by the "cycle start" pulse 21. It feeds the electromagnet 1 via an amplifier 27. The bistable 26 changes only when the down counter 19 is at zero (i.e. when the output 25 supplies the logic state 1). This de-energizes the electromagnet 1 and immobilizes the wheel 4.

The "cycle start" pulse 21 is also sent to a reset to zero input 28 of a counter 29 which is incremented by one unit at each pulse which reaches the counting input 30 of the photo-electronic detector 11 whose signals are shaped by the stage 37.

The comparator 20 receives on its input 31 the data of the counter 29 and indicates at the output 32 whether there is identity between the input memory 16 and the counter 29 which expresses the wheel position considered. A signal with a logic state 1 appears at the output 32 of the comparator in the case of said identity; the signal is sent on one of the two inputs of an AND gate 32, the other input receiving a validation pulse 33 generated at the end of the rotation of the drive shaft 9. The output signal 34 of the AND gate 32 allows the roll of paper to be printed on when its printing wheel 4 is stopped. If there is no identity inside the comparator 20, the output 32 will be in the logic state 0 and nothing will be printed.

The printer in accordance with our invention provides greater reliability due to the two sensors, one of which indicates the position of the drive shaft and the other of which indicates the number of positions passed before the wheel stops.

The invention relates to printers used for counting in which part of the calculation is performed mechanically and another part of the calculation is performed electronically.

What is claimed is:

1. A printer having a plurality of electrically controlled print wheels, means for driving said print wheels by a drive shaft rotating alternately in a drive direction and then in a return direction and for pausing for printing between the movements in opposite directions, each of said print wheels having typographical characters on its periphery and each being associated with a ratchet wheel having teeth on its periphery, a stop lever for each ratchet wheel and engageable with a tooth thereof, an electromagnet for each stop lever for effecting disengagement of the stop lever from the teeth of an associated ratchet wheel, means for supplying an electronic signal representative of the value displayed when the angular movement of the drive shaft corresponds to the value to be displayed to said electromagnet for causing an associated stop lever to engage the teeth of an associated ratchet wheel, a check wheel for each print wheel, means for uncoupling said shaft from said ratchet wheel to separate the drive shaft from said print wheel subsequent to engagement of said stop lever with a tooth of said associated ratchet wheel, electronic means for counting the number of positions through which each of said print wheels rotates between a starting position and a stopping position to validate the position of a print wheel set by a stop lever by comparison of each print wheel actual position with its intended position, said electronic means for validating the position of said print wheels including: an input memory, at least one photo-electronic detector which detects the number of positions passed through by a check wheel driven by said print wheel, an electronic counter connected to said at least one photo-electronic detector for receiving signals responsive to the number of positions passed through by said check wheel, a comparator for comparing digital data corresponding to check wheel movement with data from said input memory, the identity of the two sets of data resulting in a logic signal, means for deriving an end of rotation signal from said drive shaft, and an AND gate for combining said logic signal from said comparator with said end of rotation signal to provide an output signal from said AND gate for use in validating the position of the print wheel prior to printing, a keyboard for providing a binary value input signal to said input memory corresponding to the required stop position for each print wheel, a down counter, means for supplying a cycle start pulse to said down counter, said means for sensing the position of said drive shaft comprising means for supplying signals to said down counter for decrementing said down counter at each position of said drive shaft, a bistable having its input connected to said means for providing said cycle start pulse and to the output of said down counter and its output connected to said electromagnet to de-energize said electromagnet and immobilize the print wheel, and said means for supplying a cycle start pulse being connected to said electronic counter to provide a reset to zero input to said counter which is incremented by one unit per pulse from said at least one photo-electronic detector.

* * * * *